(12) United States Patent
Brestel et al.

(10) Patent No.: US 12,444,897 B2
(45) Date of Patent: Oct. 14, 2025

(54) DISC LASER

(71) Applicant: IDEA MACHINE DEVELOPMENT DESIGN AND PRODUCTION LTD., Rehovot (IL)

(72) Inventors: Mordechai Brestel, Rehovot (IL); Shlomo Turgeman, Rishon Letzion (IL)

(73) Assignee: IDEA MACHINE DEVELOPMENT DESIGN AND PRODUCTION LTD., Rehovot (IL)

( * ) Notice: Subject to any disclaimer, the term of this patent is extended or adjusted under 35 U.S.C. 154(b) by 805 days.

(21) Appl. No.: 17/631,524

(22) PCT Filed: Jul. 29, 2020

(86) PCT No.: PCT/IB2020/057127
§ 371 (c)(1),
(2) Date: Jan. 31, 2022

(87) PCT Pub. No.: WO2021/019447
PCT Pub. Date: Feb. 4, 2021

(65) Prior Publication Data
US 2022/0271490 A1 Aug. 25, 2022

Related U.S. Application Data

(60) Provisional application No. 62/881,139, filed on Jul. 31, 2019.

(51) Int. Cl.
*H01S 3/08* (2023.01)
*H01S 3/03* (2006.01)
(Continued)

(52) U.S. Cl.
CPC ........ *H01S 3/08059* (2013.01); *H01S 3/0305* (2013.01); *H01S 3/0315* (2013.01);
(Continued)

(58) Field of Classification Search
CPC ... H01S 3/0315; H01S 3/0835; H01S 3/08095
See application file for complete search history.

(56) References Cited

U.S. PATENT DOCUMENTS 3,815,977 A * 6/1974 Vasiliev ................. G02B 5/04
257/E31.127
3,940,711 A 2/1976 Casperson
(Continued)

FOREIGN PATENT DOCUMENTS

WO 2014/128499 8/2014

OTHER PUBLICATIONS

EMPA Scientific Materials and Technology, "Absorption mask for high sensitivity laser spectroscopic trace gas analysis", 2013.
(Continued)

*Primary Examiner* — Sean P Hagan
(74) *Attorney, Agent, or Firm* — Daniel Feigelson

(57) ABSTRACT

There is provided a laser system having a cylindrically-shaped annular mirror with at least one opening in its surface; a pair of planar metallic electrodes disposed proximate opposite edges of the annular mirror, normal to the axis of the annular mirror, the electrodes configured to have an RF field applied between them; a pair of end mirrors disposed at said at least one opening; and a ceramic material in the form of a disc, disposed in the internal volume of the annular mirror, the ceramic material having a series of channels formed therein such that they generate a zig-zag pathway in the ceramic material, wherein (i) the zig-zag path, when filled with a gain medium, (ii) the annular mirror and (iii) the pair of end mirrors, together constitute a laser cavity.

20 Claims, 2 Drawing Sheets

(51) Int. Cl.
*H01S 3/038* (2006.01)
*H01S 3/041* (2006.01)
*H01S 3/223* (2006.01)

(52) U.S. Cl.
CPC .......... *H01S 3/0385* (2013.01); *H01S 3/0388* (2013.01); *H01S 3/041* (2013.01); *H01S 3/08095* (2013.01); *H01S 3/2232* (2013.01)

(56) References Cited

U.S. PATENT DOCUMENTS

| | | | | |
|---|---|---|---|---|
| 4,439,860 | A | * | 3/1984 | Kurnit ..................... H01S 3/063 |
| | | | | 372/64 |
| 4,577,323 | A | * | 3/1986 | Newman ............... H01S 3/0975 |
| | | | | 372/64 |
| 4,740,983 | A | * | 4/1988 | Azad ....................... H01S 3/093 |
| | | | | 372/100 |
| 4,780,882 | A | | 10/1988 | Nir |
| 4,870,654 | A | * | 9/1989 | Cantoni ................ H01S 3/0315 |
| | | | | 372/66 |
| 4,945,547 | A | | 7/1990 | Greene |
| 4,961,201 | A | * | 10/1990 | Opower ................ H01S 3/0315 |
| | | | | 372/64 |
| 5,136,608 | A | | 8/1992 | Bernard et al. |
| 6,192,061 | B1 | | 2/2001 | Hart et al. |
| 7,046,709 | B2 | | 5/2006 | Vernon et al. |
| 7,876,443 | B2 | | 1/2011 | Bernacki |
| 9,052,232 | B2 | | 6/2015 | Smith |
| 2002/0185603 | A1 | * | 12/2002 | Daly ..................... G01N 21/031 |
| | | | | 356/246 |
| 2010/0091359 | A1 | * | 4/2010 | Yamamoto ............ H01S 3/2325 |
| | | | | 359/347 |
| 2014/0168649 | A1 | * | 6/2014 | Smith ................... G01N 21/031 |
| | | | | 356/246 |
| 2018/0120222 | A1 | * | 5/2018 | Fritz .................. G01N 21/3504 |
| 2021/0119399 | A1 | | 4/2021 | Turgeman et al. |

OTHER PUBLICATIONS

LaserFocusWorld Technical Digest, "Mid-IR spectroscopy: key components", PennWell Corporation, 2018.
Mangold et al., "Circular paraboloid reflection cell for laser spectroscopic trace gas analysis", Journal of the Optical Society of America A, vol. 33, No. 5, May 2016, pp. 913-919.
Mangold et al., "Cylindrical multipass reflection cells for optical trace gas sensing", nano-tera.ch, IrSens 2, RTD 2013, available at http://www.nanotera.ch/pdf/posters2015/IrSens936.pdf.
Casperson, "Cylindrical laser resonators", Journal of the Optical Society of America, vol. 63, No. 1, Jan. 1973, pp. 25-29.

* cited by examiner

DISC LASER

RELATED APPLICATIONS

This application claims the benefit of, and priority from, U.S. provisional application No. 62/881,139, entitled "DISC LASER" and filed 31 Jul. 2019, the contents of which are incorporated herein by reference.

FIELD OF THE INVENTION

The present invention relates to the field of compact RF excited lasers, especially having a disc shape for increased compactness.

BACKGROUND

Since DC longitudinally excited lasers are generally limited to an output of the order of 80 Watts/m length of the laser cavity, other technologies have been developed, such as fast flow technologies on the one hand, and diffusion cooling between flat slabs on the other hand, both of these techniques providing much higher output powers per length than the original simple DC longitudinally excited lasers. In addition, for slab lasers using diffusion cooling, the confinement of the gaseous lasing medium to channels within a ceramic insert within the laser gap, also increases the achievable laser output substantially. Such RF excited slab lasers with the beam path defined by channels in a ceramic slab element are well known, such as in U.S. Pat. No. 7,046,709 for $CO_2$ Laser with Beryllium Oxide Waveguides" to V. Seguin et al, U.S. Pat. No. 6,192,061 for "RF Excited Waveguide Laser" to R. A. Hart et al, and U.S. Pat. No. 6,798,816 for "Folded Tapered-Waveguide $CO_2$ Laser", to A. J DeMaria et al.

However, such slab lasers have to be sufficiently wide to accommodate the full width of the slab. In co-pending International Patent Application PCT/IB2019/050724 for Compact Coaxial Laser, commonly owned and having a common inventor with the present application, there is described a novel cylindrically shaped RF excited laser cavity, having a folded optical resonator cavity defined by spherical mirrors mounted at opposite ends of the cylinder, which enables the generation of a multipass beam path between the mirrors, with each beam pass inclined at a small angle to the axis between the mirrors, and the beam paths contained within channel sin a channeled ceramic cylindrical element. The advantage of such a cavity geometry is that a long optical path is achieved within a short physical structure. This enables a good mode and a high power output to be achieved in a short mechanical structure.

The disclosures of each of the publications mentioned in this section and in other sections of the specification, are hereby incorporated by reference, each in its entirety.

SUMMARY

There is provided in accordance with an embodiment of the invention a laser system comprising:
  an annular mirror whose inner surface has a high reflectivity at the wavelength at which the laser system is intended to lase, the annular mirror having at least one opening in its surface;
  a pair of planar metallic electrodes disposed proximate opposite edges of the annular mirror, normal to the axis of the annular mirror, the electrodes configured to have an RF field applied between them;
  a pair of end mirrors disposed at the at least one opening, one of the end mirrors being a high reflectivity mirror, and the other of the end mirrors being a partial reflector; and
  a ceramic material in the form of a disc, disposed in the internal volume of the annular mirror, the ceramic material having a series of channels formed therein such that they generate a zig-zag pathway in the ceramic material, each leg of the zig-zag path being aligned at an angle such that the leg does not pass through the axis of the annular mirror, and meets the annular mirror at a different pair of points around the circumference of the annular mirror,
  wherein, (i) the zig-zag path, when filled with a gain medium, (ii) the annular mirror and (iii) the pair of end mirrors, together constitute a laser cavity.

In some embodiments, the at least one opening is a single opening, such that two adjacent legs of the zig-zag path meet at the single opening, the said pair of end mirrors are both positioned at the single opening at angles such that one end mirror is normal to one of the legs of the zig-zag path meeting at the one opening and the other end mirror is normal to the other of the two legs of said zig-zag path meeting at the one opening. In some embodiments, one of the pair of end mirrors is positioned normal to a first leg of the zig-zag path, and the other of the end mirrors is positioned normal to a second leg of the zig-zag path, the second leg being positioned in the zig-zag path relative to the first leg, after a plurality of meetings of the zig-zag path with theannular mirror.

In some embodiments, the at least one opening is a pair of openings, and the zig-zag path begins at one of the pair of openings and ends at the other of the pair of openings. In some embodiments, one of the pair of end mirrors is positioned at a first one of the pair of openings, and is aligned normal to a first leg of the zig-zag path, and the other of the end mirrors is positioned at a second one of the pair of openings, and is aligned normal to a second leg of the zig-zag path, the second leg being positioned in the zig-zag path relative to the first leg after a plurality of meetings of the zig-zag path with the annular mirror.

In some embodiments, the laser system further comprising cooling passages attached to the pair of planar metallic electrodes.

In some embodiments, the annular mirror has a straight cylindrical shape. In some embodiments, the annular mirror has a curvature also out of the plane of the annulus.

In some embodiments, the ceramic material is selected from the group consisting of beryllium oxide and aluminium oxide.

In some embodiments, the laser is a carbon dioxide laser. In some embodiments, the laser is a carbon monoxide laser.

In some embodiments, either of said planar metallic electrodes having contact with the channels has an intermediate layer in contact with the channels, providing resistance from reaction with an RF-excited gaseous gain medium in the channels. In some embodiments, the intermediate layer is either a coating on said planar metallic electrode, or an intermediate metallic sheet. In some embodiments, the intermediate layer is a silver foil. In some embodiments, the silver foil is coated with gold on the side of the foil facing said channels.

In some embodiments, the reflectivity of the annular mirror is at least 90%. In some embodiments, the reflectivity of the annular mirror is at least 91%, 92%, 93%, 94%, 95%, 96%, 97%, 98%, or 99%.

In some embodiments, the reflectivity of the high reflectivity end mirror is at least 90%. In some embodiments, the reflectivity of the high reflectivity end mirror is at least 91%, at least 92%, at least 93%, at least 94%, at least 95%, at least 96%, at least 97%, at least 98%, at least 99%.

In some embodiments, the laser system further comprises a gain medium disposed within the channels.

There is also provided method of generating a laser beam, comprising applying an RF field between the pair of planar metallic electrodes of a laser system as described herein, whereby to cause lasing of the gain medium.

The present disclosure describes new exemplary laser systems for providing a laser geometry having even greater compactness than that of the lasers described in PCT/IB2019/050724, while maintaining high beam quality. The systems enable the generation of a large optical path within small overall dimensions, thus improving on some of the disadvantages of prior art laser systems.

According to a first exemplary implementation of the systems of the present disclosure, such a laser system may comprise an annular mirror whose circumferential inner surface has a high reflectivity at the wavelength at which the laser system is intended to operate. A ceramic medium having high thermal conductivity, in the form of a thin disc, essentially fills the inner volume of the annular mirror, with the exception of a series of channels formed in at least part of the thickness of the disc, the channels following a zig-zag pattern between selected points on the circumferential annular mirror. The pattern is modelled to follow an optical path, beginning at a single point on the circumference of the annular mirror, the path being oriented at an angle to a line that would pass through the central axis of the disc and the annular mirror, such that a beam propagating along the optical path performs a number of reflections off the inner surface of the annular mirror. After a predetermined number of reflections, the path again meets the single point at which the path began. In order for this path to be achieved, the path must also be aligned such that a beam propagates along it in a single plane, that plane being perpendicular to the axis of the disc.

The advantage of such a cavity geometry is that a long optical path is achieved within a small-dimensioned physical structure. This enables a good mode and a high power output to be achieved in a minimally sized structure.

Thus, a beam of light input into the disc at the selected angle, after performing the predetermined number of reflections, can exit the disc at the same point at which it entered the disc. The entry and exit point can be achieved by an opening in the annular mirror, which acts as an output coupling aperture. The channels in the ceramic are modelled such that they accurately follow this predetermined optical path, covering the internal volume of the disc. The optical path of the resonator thus performs an elongated path by successive reflections around the inner surface of the high reflectivity circumferential mirror. As an alternative implementation, the extremities of the optical path need not be at the same point, with the last channel terminating at a different point of the circumference from the starting point, if this is geometrically and physically preferable, though the most compact, and the most advantageous configuration from energy density aspects, is obtained when the entry and exit points are coincident, since this utilizes the maximum length of the cylindrical mirror.

The extremities of the zig-zag optical path are equipped with end mirrors, one of which serves as the back-reflector of the cavity and has a high reflectivity, and the other being a partial reflector to provide output coupling of the beam, such that a laser cavity is formed between the end mirrors. Each end mirror should be aligned such that it is normal to the channel of the zig-zag path whose beam it is intended to reflect. The optical path geometry of the proposed laser can thus be visualized as resembling that of a three-dimensional cylindrical Herriot cell, in which the end plates containing the cavity reflectors have been squashed into each other such that the optical paths all take place in a single plane, and in order to generate the beam reflections in that plane, a circumferential mirror is used, in place of the planar mirrors at the ends of a Herriott cell resonator.

The top and bottom surfaces of the disc should be equipped with conducting electrodes, such that a gain medium located within the channels can be excited by an RF electrical field applied between the electrodes, such that under the correct conditions of pressure, temperature and RF power, lasing can occur in the gain medium. The laser energy can be coupled out of the optical path of the resonator by use of a partial reflector as one of the extremity mirrors. The advantage of such planar electrodes is that they can be readily cooled over their entire surface, such as by water flowing in tubes thermally attached to the electrodes or by forced convection using streaming air from a fan. The channels should be cut only into a part of the thickness of the ceramic disc, such that the mechanical integrity of the complete disc is maintained. If the channels were cut from electrode to electrode, the ceramic would be divided into numerous parts, which would make it difficult to maintain their alignment.

The selected angle of entry and exit of the optical beam is chosen such that the multiple reflected path of the beam avoids passage through the central axial area of the disc, so that a comparatively small number of reflections are generated. If a very large number of reflections were to be used, the stability of the lasing resonator would be reduced, since small deviations of the entry angle would result in the beam not returning to its original entry point. Furthermore, the large number of reflections from the circumferential annular mirror would result in increased absorption, since the mirror cannot show 100% reflectivity, and the power lost at each reflection needs to be replenished by the gain medium. In this respect, the presently described laser cavity structures are very distinctly different from annular cavities used for spectroscopic analysis, where the object is to provide the longest path possible within the cavity, in order to provide the maximum absorption of the beam in passing through the gas to be spectroscopically analyzed. The geometry of such spectroscopic analysis cavities thus differs from the presently described laser cavities, in that the beam is input to the spectroscopic analysis cavities at an angle very close to that of the radial direction, such that a very large number of traverses and of reflections at the annular mirror are generated. Such spectroscopic analysis cavities have been described for instance in U.S. Pat. No. 7,876,443 to B. Bernacki et al, for "Multipass Optical Device and Process for Gas and Analyte Determination", and in the article entitled "Compact Multi-Pass Optical Cell for Laser Spectroscopy", by B. Tuzson et al, published in Optics Letters, Vol. 38, No. 3 Feb. 2013, pages 257-259. Furthermore, disc cavities having multiple beam passages through the axis of the disc have been described for use as laser cavities, such as U.S. Pat. No. 3,950,712, to P. Chenausky et al, for "Unstable Laser Resonator having Radial Propagation", and in U.S. Pat. No. 3,940,711 to L. Casperson, for "Cylindrical Laser Resonator". In both of these patents, an important feature is that there is strong focusing and therefore a high energy density on the axis of the disc, and this location is therefore used to extract the beam in the direction of the axis of the disc, i.e. perpendicular to the plane of the disc.

The circumferential mirror can be formed as a cylindrical annular mirror, whose surface profile along the direction of the axis of the annular mirror, i.e. along the height of the annular mirror, has essentially an infinite radius of curvature, but may be advantageously formed as a section of a torus, with a concavely curved internal profile whose curvature is out of the plane of the annulus, in order to improve the mode of the resonator. An advantageous implementation of this arrangement is with the radius of curvature being equal to the radius of the annular mirror, such that the beam is focused towards the center of the annulus, and then diverges from its optimally focused position to impinge on the mirror at the opposite side of the central region with approximately the same diameter as that which it had at the mirror diametrically opposite the point of impingement. The profile of the beam within the resonator is thus symmetrical relative to the cross section of the disc geometry. This provides minimal divergent losses of the laser power. The exact optical form of the partial torus-shaped mirror should be determined by means of optical design and not from simplified geometrical considerations, as outlined above. The mirror can then be manufactured e.g. by conventional diamond machining techniques, whether having a flat vertical profile, or a spherical or aspherical profile.

A typical laser cavity based on the above described features, may have of the order of 10 to 20 passes through the disc before the beam exits from the coupling aperture. The optical path length within the resonator between the end reflectors can thus be of the order of e.g. from 1 meter to 10 meters for a small industrial or medical laser. In order to limit the absorption losses generated by multiple reflections, the number of passes of the beam across the cavity should be limited to approximately 20, though in cases where a very high reflection annular mirror coating is used, the number may be somewhat higher.

The required level of the reflectivity of the "high reflectivity" mirror is determined by the number of reflections which the beam makes with the mirror during its passage through the entire path of the cavity. The larger the number of passes, the higher the reflectivity needs to be because of the losses generated at each reflection. On the other hand, the larger the number of passes, the closer each reflection is to a normal incidence, this having lower losses than a reflection at a larger angle of incidence. These effects may then tend to cancel each other out. Furthermore, the reflectivity required is also dependent on the gain of the lasing medium, and on the reflectivity of the output coupler since the gain has to more than compensate for power losses during multiple passages of the multiple path beam through the cavity. The reflectivity should be as high as possible to reduce such losses in the cavity, commensurate with the increased cost of higher reflection mirrors. Furthermore, the level of reflectivity should also be chosen with consideration to the knowledge that very high reflectivity coatings generally requiring more complex coatings, and besides the increased costs, damage threshold often decreases with the complexity of the reflective coating. For lasers operating in the range of approximately 0.7 µm to 20 µm, simple protected gold coatings have approximately 96% reflectivity, while more sophisticated coatings can increase this reflectivity to 99% or even slightly more. The level of reflectivity chosen is thus known to the skilled person, as being dependent on the disc laser geometric configuration, on the gain medium, on the output coupler reflectivity, on the laser wavelength, on the mirror cost budget, on the required lifetime expectation, and on any other characteristics that may be required. As stated, the skilled laser designer is able to combine all of the factors involved and to determine what level of high reflectivity is required for a particular disc laser design. In some embodiments the reflectivity of the annular mirror is at least 90%. In some embodiments the reflectivity of the annular mirror is at least 91%. In some embodiments the reflectivity of the annular mirror is at least 92%. In some embodiments the reflectivity of the annular mirror is at least 93%. In some embodiments the reflectivity of the annular mirror is at least 94%. In some embodiments the reflectivity of the annular mirror is at least 95%. In some embodiments the reflectivity of the annular mirror is at least 96%. In some embodiments the reflectivity of the annular mirror is at least 97%. In some embodiments the reflectivity of the annular mirror is at least 98%. In some embodiments the reflectivity of the annular mirror is at least 99%. Similarly, in some embodiments the reflectivity of the high reflectivity end mirror is at least 90%. In some embodiments the reflectivity of the high reflectivity end mirror is at least 91%. In some embodiments the reflectivity of the high reflectivity end mirror is at least 92%. In some embodiments the reflectivity of the high reflectivity end mirror is at least 93%. In some embodiments the reflectivity of the high reflectivity end mirror is at least 94%. In some embodiments the reflectivity of the high reflectivity end mirror is at least 95%. In some embodiments the reflectivity of the high reflectivity end mirror is at least 96%. In some embodiments the reflectivity of the high reflectivity end mirror is at least 97%. In some embodiments the reflectivity of the high reflectivity end mirror is at least 98%. In some embodiments the reflectivity of the high reflectivity end mirror is at least 99%.

The structure and geometry of the above described laser cavity has a number of significant structural advantages over prior art laser technology. Some of these advantages may be summarized as:

(a) The single α nnular mirror acting as the folding mirror for the multiple passes of the laser beam within the cavity, makes the cavity simpler to construct, with the beam accurately aligned within the cavity.

(b) The large planar electrodes enable efficient cooling from both sides of the laser structure, without the need for complex vacuum integrity.

(c) Easy access for RF voltage tuning and adjustment from outside, without the need to penetrate the vacuum enclosure.

(d) The symmetry of the RF structure enables simple RF feed procedures.

(e) The compactness of the ceramic disc with its integral channels provides an improved ratio of reservoir gas volume to lasing channel volume.

(f) The simple mechano-optical construction provides high robustness to the laser.

(g) The planar ceramic insert form enables simple construction and hence low cost production, e.g. by 3-D printing or by sintering.

(h) The output beam direction and the flat structural shape enables convenient installation and use of the laser.

BRIEF DESCRIPTION OF THE DRAWINGS

Embodiments of the present invention will be understood and appreciated more fully from the following detailed description, taken in conjunction with the drawings in which:

FIG. 2A illustrates isometrically an exemplary channeled ceramic disc insert, whose channels are used in order to confine the plasma discharge to within the channels only, while

DETAILED DESCRIPTION

Figure 1:
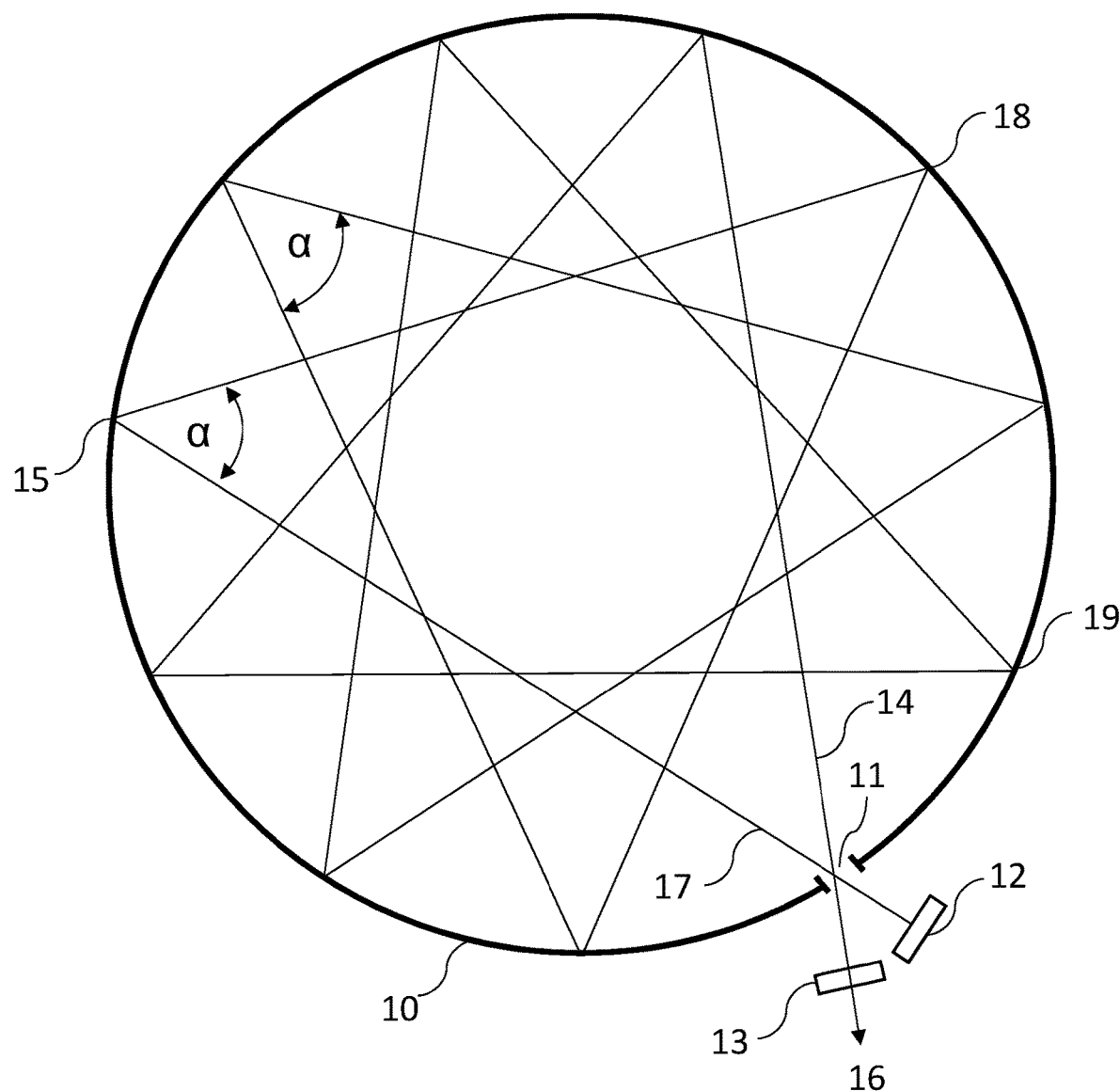
FIG. 1 illustrates schematically a plan view of the zig-zag trajectories traced by a beam traversing an exemplary resonator of a laser system of the present application.

Reference is now made to FIG. 1, which illustrates schematically a plan view of the trajectories 14, 17, traced by a beam traversing an exemplary resonator of a laser system of the present application. The beam path is determined by successive reflections on the circumferential annularly shaped mirror 10 at points 15 which define a polygonal shape characterized by the number of apexes and the angle $\alpha$, which the beam makes in its trajectory between apexes. The annularly shaped mirror therefore behaves like a whispering gallery, in that the beam travels around the periphery of the annularly shaped mirror 10 in a series of reflections from the mirror. The beam may be advantageously coupled out of the cavity by means of an aperture 11, formed in the wall of the annular mirror 10. Since the beam must, after entry into the cavity at the output coupling aperture 11, traverse the entire circumference of the annularly shaped mirror, and then return to the same output coupling aperture, the injection angle of the beam, as defined by the angle of the full reflector 12 and output coupler 13 of the laser, must be selected such that after a limited number of traverses, the beam again impinges on the beam coupling aperture. As previously mentioned if the angle is made such that the beam propagates at too close an angle to the circumference, coupling into and out of the beam coupling aperture 11 would be difficult because of the sensitivity to the beam angle $\alpha$. In other words, for a beam propagating very closely to the annular mirror, a small deviation in the injection angle from the desired angle would result in the beam path missing the aperture on its return after circumventing the cavity. Therefore, the number of passages between reflections of the beam within the cavity should be limited to a predetermined number, typically of the order of 10 to 20, so that the beam does readily close on itself at its entry point. In order to reduce the angular sensitivity of the beam path segments, each segment is oriented such that it does not impinge on the next available reflection apex, but skips a small number of apexes, in order to reduce the effective angle of the beam entering the cavity, relative to the normal to the circumferential mirror at the entry point. The angle must still be carefully aligned such that after the predetermined number of traverses of the cavity, the beam does accurately reach the beam coupling aperture. Thus for instance, in the exemplary cavity shown in FIG. 1, the beam angle $\alpha$ is aligned such that after impinging on the mirror at apex point 15, the beam next impinges on the fourth apex 18 of the star-shaped beam trajectory around the circumferential annular mirror. In the example shown, the end mirrors 12, 13, are aligned at such an angle that the apex included angle $\alpha$ is approximately 49°, this angle being calculated exactly to provide 11 traverses of the beam across the annular mirror space, with 11 corresponding reflections at apexes of the folded beam path, the angle ensuring that each reflected beam next impinges on the annular mirror at the fourth apex position of the star-shaped beam trajectory, from the previous reflection.

Additionally, as previously mentioned, the angle $\alpha$ should not be made too small, since that would result in a larger number of traverses and reflections, and since the reflectivity of the circumferential mirror is not 100%, and for a gold mirror for instance is of the order of 99% at the $CO_2$ lasing wavelength, an inordinately large number of reflections of the beam path with the circumferential mirror would result in excessive cavity losses, and reduction in the lasing efficiency. Furthermore, as previously mentioned, a smaller angle may result in greater sensitivity to end mirror alignment.

In the exemplary cavity path shown in FIG. 1, the output beam 16, is milked from the cavity through the output coupler 13 having partially reflecting optical properties, and the output coupler 13 and the full reflector end mirror 12, are located at a single $\alpha$ perture 11 in the annular mirror, this providing the optimum use of the internal volume of the cavity. However, using the same angular configuration, it would be possible to have a further aperture at the apex 19, for instance, and to position one of the end mirrors at this aperture and the other at the original aperture 11. By this means, the full reflector and the output coupler could be spatially separated, should this provide a more convenient mechanical design, but this would involve loss of three traverses of the beam across the cavity volume. Similarly, the apex included angle $\alpha$ could be made somewhat smaller in order to compensate for these lost traverses. However, the arrangement in FIG. 1 with a single aperture 11 provides the most space-efficient configuration.

The exit and entry aperture of the beam need not have a physical window at the annular mirror 10, since the complete assembly can be constructed within a vacuum tight box, with a vacuum window at any convenient point. This is advantageous since the angle of incidence at the aperture may be significantly different from normal incidence, and an antireflection coating for such an angle of incidence may be more complex to design and coat.

Because of the novel zig-zag path design, the optical path length within the resonator between the end reflectors can thus be made disproportionately long in comparison with the lateral dimensions of the cavity. Thus for instance, in the cavity shown in FIG. 1, the mirror diameter is only 120 mm, and yet for the 11-segmented beam path shown, a beam path of the order of 1,210 mm is obtained, illustrating the compactness of the laser cavity. A relatively long beam path within the laser cavity increases efficiency and pointing stability, on condition that the number of passes is such that the lasing efficiency is not significantly affected by the numerous reflections engendered.

Figure 2A:
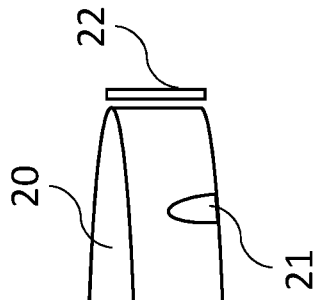

Reference is now made to FIG. 2A, which illustrates isometrically a channeled ceramic disc insert 20, whose channels 21 are used in order to confine the plasma discharge to within the channels only. The channels in the ceramic element have a precalculated shape and dimension, and when mounted inside the annular mirror 22, duplicate the zig-zag optical beam path defined by the annular mirror radius, and the angle of entry of the beam from the end mirrors. Since the volume of the excited plasma is defined by the ceramic channels, which have a significantly reduced volume compared with prior art lasers, the RF exciting power level required to provide a specific power output is reduced, thereby improving beam quality compared with that of prior annular lasers, such as that described in U.S. Pat. No. 4,847,852 for "Ultra Compact RF Excited Gaseous Lasers", having a common inventor with the present application. The laser efficiency is thus increased compared to other prior art multipass lasers not using channeled ceramic inserts. Furthermore, the small channel volume means that a comparatively small volume gas reservoir may be used, thereby saving device volume. In addition, the close proximity of the heat conductive ceramic insert to the discharge within the channels, provides a better level of cooling, thereby also assisting in increasing the laser efficiency. FIG. 2A also shows the location of the circumferential annular mirror 22, disposed around the outer periphery of the ceramic disc insert. Although a single element annulus may be the most convenient bending mirror to use, because of its single piece construction, it may be more economical to use segments of planar mirrors arranged around the circumference of the ceramic disc.

Figure 2B:
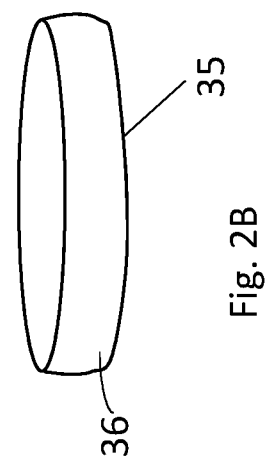
FIG. 2B shows an alternative annular mirror having a radius of curvature out of the plane of the annulus.

FIG. 2B now shows an alternative configuration 35 for the annular circumferential mirror, in which instead of a cylindrical reflection surface, as in FIG. 2A, the reflection surface 36 is formed having a curved shape, having a radius of curvature also in the direction out of the annulus, such that it focusses the beam towards a waist at the center of the annulus, as described hereinabove in the summary. This shape can be used to compensate for beam divergence, and provides better stability to the mode structure of the beam.

Figure 3:
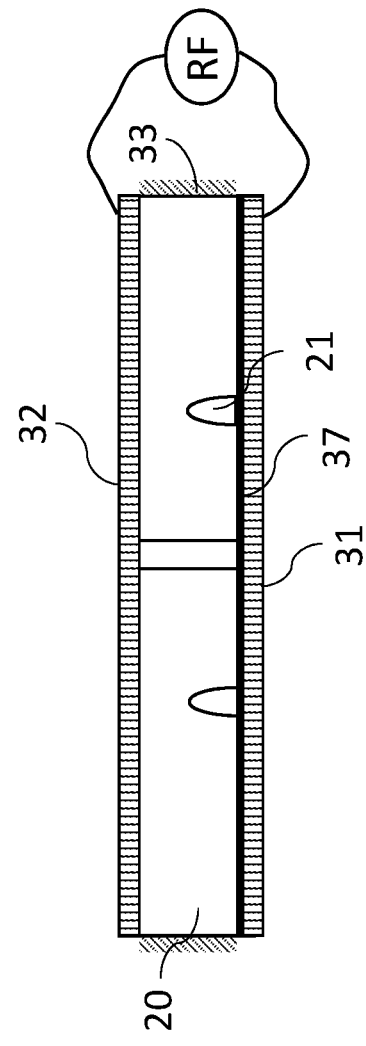
FIG. 3 illustrates a schematic cross-sectional view of the ceramic disc of FIG. 2A, showing the beam path channels and the planar electrodes.

Reference is now made to FIG. 3, which illustrates a schematic cross-sectional view of the ceramic disc 20 of FIG. 2A, showing the beam path channels 21, and the planar electrodes 31, 32, between which the radiofrequency (RF) exciting voltage is applied. The application of this voltage is shown schematically in FIG. 3, but can be applied in practice by using conventional RF connectors (not shown in FIG. 3) located on the top and bottom electrodes, most conveniently at their centers. RF matching can be performed without interfering with the optical structure of the cavity since all of the matching elements are external to the cavity structure. In the example shown in FIG. 3, the annular reflecting mirror 33 is shown schematically. Since the electrodes may advantageously be constructed of aluminium, having good electrical and thermal conductivity, and since aluminium may not have good resistance to the RF excited gas discharge in the channels 21, the side of the plate 31 in contact with the channels may need to be coated with a more inert layer 37, such as a gold coating, or may need to have an intermediate metal sheet 37, such as titanium, to provide long life and to avoid contaminating the laser gas fill. The electrodes may be readily cooled by means of water tubes attached thereto (not shown in FIG. 3), or by forced cooling air flow across their surface, though the latter method cannot be used if the entire laser cavity with electrodes is contained within an outer vacuum-tight enclosure.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A system comprising:
    an annularly-shaped mirror whose inner surface has a high reflectivity at the wavelength at which said laser system is intended to lase, said annularly-shaped mirror having at least one opening in its surface;
    a pair of planar metallic electrodes disposed proximate opposite edges of said annularly-shaped mirror, normal to the axis of said annularly-shaped mirror, said electrodes configured to have an RF field applied between them;
    a pair of end mirrors disposed at said at least one opening, one of said end mirrors being a high reflectivity mirror, and the other of said end mirrors being a partial reflector; and
    a ceramic material in the form of a disc, disposed in the internal volume of said annularly-shaped mirror, said ceramic material having a series of channels formed therein such that they generate a zig-zag pathway in the ceramic material, each leg of said zig-zag path being aligned at an angle such that said leg does not pass through the axis of said annularly-shaped mirror, and meets said annularly-shaped mirror at a different pair of points around the circumference of said annularly-shaped mirror,
    wherein; said channels are adapted to contain a gain medium, and
    wherein (i) said zig-zag path, (ii) said annularly-shaped mirror and (iii) said pair of end mirrors, together constitute a resonant cavity.

2. A system according to claim 1, wherein said at least one opening is a single opening, such that two adjacent legs of said zig-zag path meet at said single opening, and said pair of end mirrors are both positioned at said single opening at angles such that one end mirror is normal to one of the legs of said zig-zag path meeting at said one opening and the other end mirror is normal to the other of said two legs of said zig-zag path meeting at said one opening.

3. A system according to claim 2, wherein one of said pair of end mirrors is positioned normal to a first leg of said zig-zag path, and the other of said end mirrors is positioned normal to a second leg of said zig-zag path, said second leg being positioned in said zig-zag path relative to said first leg, after a plurality of meetings of said zig-zag path with said annularly-shaped mirror.

4. A system according to claim 1, wherein said at least one opening is a pair of openings, and said zig-zag path begins at one of said pair of openings and ends at the other of said pair of openings.

5. A system according to claim 4, wherein one of said pair of end mirrors is positioned at a first one of said pair of openings, and is aligned normal to a first leg of said zig-zag path, and the other of said end mirrors is positioned at a second one of said pair of openings, and is aligned normal to a second leg of said zig-zag path, said second leg being positioned in said zig-zag path relative to said first leg after a plurality of meetings of said zig-zag path with said annularly-shaped mirror.

6. A system according to claim 1, further comprising cooling passages attached to said pair of planar metallic electrodes.

7. A system according to claim 1, wherein said annularly-shaped mirror has a straight cylindrical shape.

8. A system according to claim 1, wherein said annularly-shaped mirror has a curvature also out of the plane of the annulus.

9. A system according to claim 1, wherein said ceramic material is selected from the group consisting of beryllium oxide and aluminium oxide.

10. A system according to claim 1, wherein said laser is a carbon dioxide laser.

11. A system according to claim 1, wherein said laser is a carbon monoxide laser.

12. A system according to claim 1, wherein either of said planar metallic electrodes having contact with said channels has an intermediate layer in contact with said channels, providing resistance from reaction with an RF-excited gaseous gain medium in said channels.

13. A system according to claim 12, wherein said intermediate layer is selected from the group consisting of (a) a coating on said planar metallic electrode, (b) an intermediate metallic sheet, and (c) a silver foil.

14. A system according to claim 13 wherein said intermediate layer is a silver foil, and silver foil is coated with gold on the side of the foil facing said channels.

15. A system according to claim 1, wherein the reflectivity of the annularly-shaped mirror is at least 90%.

16. A system according to claim 15, wherein the reflectivity of the annularly-shaped mirror is at least 94%.

17. A system to according to claim 1, wherein the reflectivity of the high reflectivity end mirror is at least 90%.

18. A system according to claim 17, wherein the reflectivity of the high reflectivity end mirror is at least 94%.

19. A laser system comprising:
- an annularly-shaped mirror whose inner surface has a high reflectivity at the wavelength at which said laser system is intended to lase, said annularly-shaped mirror having at least one opening in its surface;
- a pair of planar metallic electrodes disposed proximate opposite edges of said annularly-shaped mirror, normal to the axis of said annularly-shaped mirror, said electrodes configured to have an RF field applied between them;
- a pair of end mirrors disposed at said at least one opening, one of said end mirrors being a high reflectivity mirror, and the other of said end mirrors being a partial reflector; and
- a ceramic material in the form of a disc, disposed in the internal volume of said annularly-shaped mirror, said ceramic material having a series of channels formed therein such that they generate a zig-zag pathway in the ceramic material, each leg of said zig-zag path being aligned at an angle such that said leg does not pass through the axis of said annularly-shaped mirror, and meets said annularly-shaped mirror at a different pair of points around the circumference of said annularly-shaped mirror,
wherein (i) said zig-zag path, (ii) said annularly-shaped mirror and (iii) said pair of end mirrors, together constitute a resonant cavity,
and further comprising a gain medium disposed within said channels.

20. A method of generating a laser beam, comprising applying an RF field between the pair of planar metallic electrodes of a laser system according to claim 19, whereby to cause lasing of the gain medium.

* * * * *